United States Patent [19]
Lee

[11] Patent Number: 5,904,380
[45] Date of Patent: May 18, 1999

[54] PIPE JOINT

[76] Inventor: Shen-Chih Lee, P.O. Box 23-487, Changhua, Taiwan

[21] Appl. No.: 08/967,171

[22] Filed: Nov. 10, 1997

[51] Int. Cl.⁶ ..................................................... F16L 37/18
[52] U.S. Cl. ............................................. 285/312; 285/38
[58] Field of Search ................................. 285/82, 87, 88, 285/311, 312, 38

[56] References Cited

U.S. PATENT DOCUMENTS

| | | | |
|---|---|---|---|
| 3,124,374 | 3/1964 | Krapp | 285/312 X |
| 3,439,942 | 4/1969 | Moore et al. | 285/312 X |
| 4,802,694 | 2/1989 | Vargo | 285/312 X |
| 5,042,850 | 8/1991 | Culler | 285/312 X |
| 5,791,694 | 8/1998 | Fahl et al. | 285/312 X |

*Primary Examiner*—Dave W. Arola

[57] ABSTRACT

A pipe joint is composed of a connection portion, two coupling handles and two auxiliary handles. The coupling handles and the auxiliary handles are fastened pivotally with two pivoting seats of the connection portion such that the coupling handles and the auxiliary handles are arranged side by side, and that the auxiliary handles can be actuated by the coupling handles in motion, and further that the auxiliary handles serve to avert the loosening of the connection portion at such time when the coupling handles are caught accidentally by a moving object or actuated accidentally by a person.

1 Claim, 4 Drawing Sheets

PIPE JOINT

FIELD OF THE INVENTION

The present invention relates generally to a pipe fitting, and more particularly to a pipe joint.

BACKGROUND OF THE INVENTION

As shown in FIG. 5, a pipe joint A of the prior art is composed of a connection portion B and two coupling handles C. The connection portion B is provided in the interior thereof with a center through hole D and in the periphery thereof with two pivoting seats E opposite in location to each other. The pivoting seats E are provided respectively with a pivoting hole F and are fastened pivotally with the coupling handles C. The coupling handles C are fastened pivotally with the pivoting seats E such that the retaining portions G of the coupling handles C are slightly extended into the center through hole D so as to facilitate the coupling of the pipes by means of the coupling handles C.

Such a prior art joint as described above is defective in design in that the coupling handles of the pipe joint are prone to be caught accidentally by a moving object to cause the loosening of the connection portion. Such an incident can turn out to be a serious or even deadly mishap if the pipe line is used to convey the gas, the toxic chemicals, etc.

SUMMARY OF THE INVENTION

The primary objective of the present invention is to provide a pipe joint which is free form the defect of the prior art pipe joint described above.

In keeping with the principle of the present invention, the foregoing objective of the present invention is attained by an improved pipe joint, which consists of a connection portion, two coupling handles, and two auxiliary handles. The connection portion is provided with two pivoting seats opposite in location to each other. The two coupling handles are fastened pivotally with the two pivoting seats of the connection portion of the pipe joint. Similarly, the two auxiliary handles are fastened pivotally with the pivoting seats of the connection portion such that the auxiliary handles are arranged side by side with the coupling handles, and that the auxiliary handles serve to avert the loosening of the connection portion at such time when the coupling handles are caught accidentally by a moving object or actuated accidentally by a person.

The foregoing objective, features, functions and advantages of the present invention will be more readily understood upon a thoughtful deliberation of the following detailed description of the a preferred embodiment of the present invention in conjunction with the accompanying drawings.

DETAILED DESCRIPTION OF THE EMBODIMENT

Figure 1:
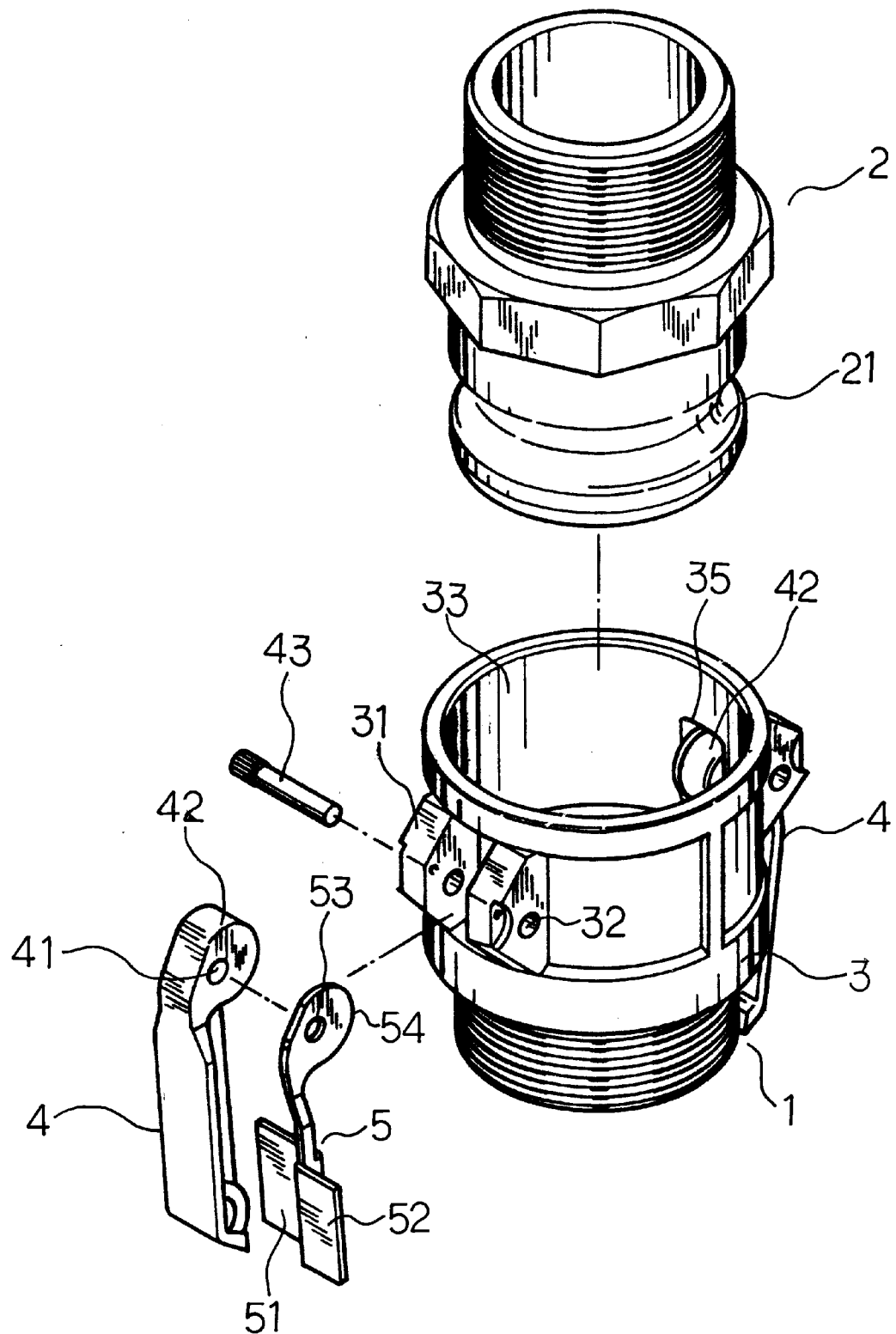
FIG. 1 shows an exploded view of the preferred embodiment of the present invention.
Figure 2:
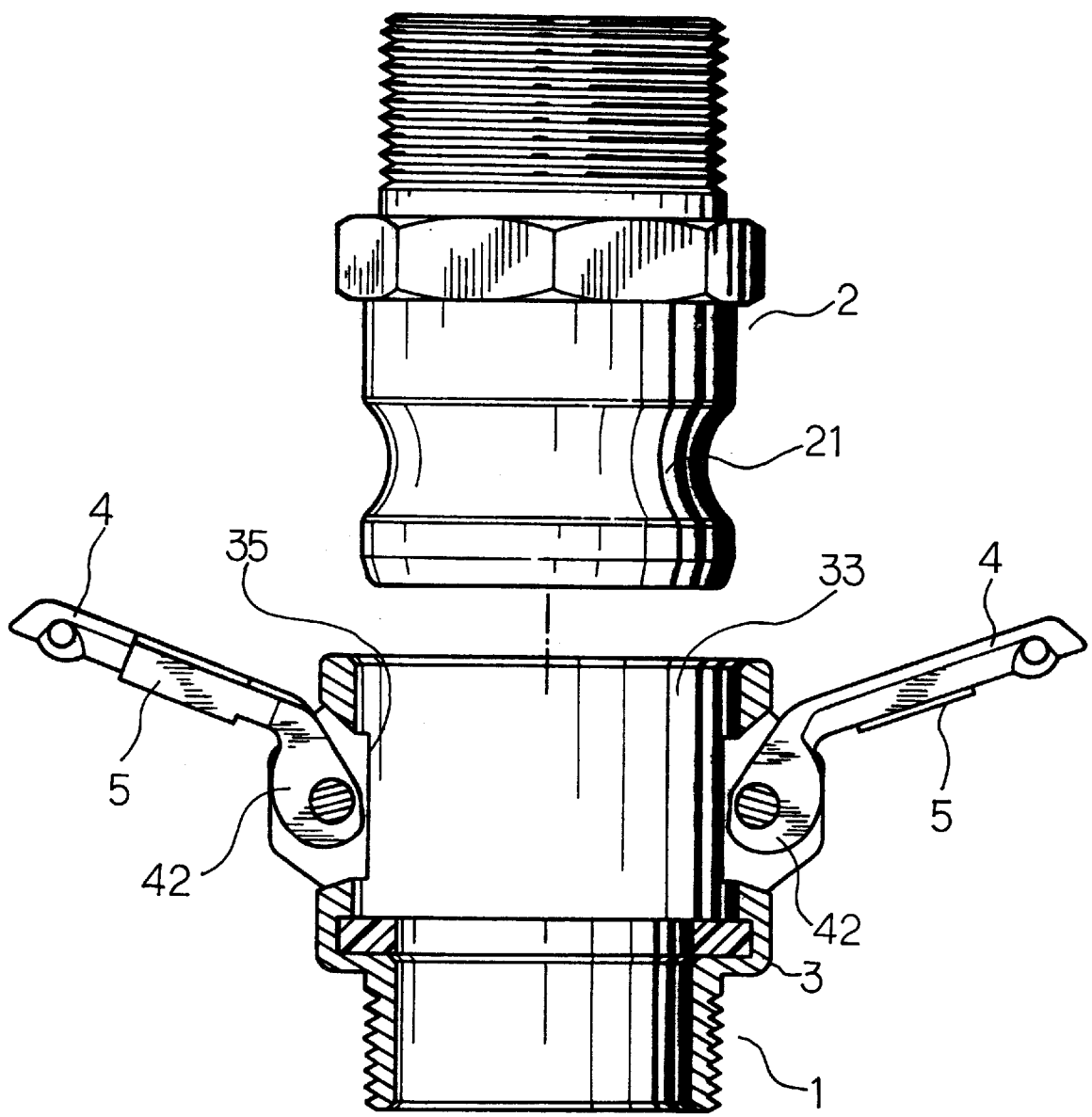
FIG. 2 shows a longitudinal sectional view of the present invention in combination.

As shown in FIGS. 1–4, a pipe joint 1 embodied in the present invention is composed of a connection portion 3, two coupling handles 4, and two auxiliary handles 5.

The connection portion 3 of a hollow cylindrical construction is provided with a through hole 33 extending along the direction of a longitudinal axis of the connection portion 3. The connection portion 3 is further provided in the outer wall thereof with two pivoting seats 31 which are similar in construction to each other and are opposite in location to each other. The pivoting seats 31 are provided respectively with a pivoting hole 32.

The coupling handles 4 are similar in construction to each other. For this reason, only one coupling handle 4 will be described. The coupling handle 4 is provided at one end thereof with a retaining portion 42 having a pivoting hole 41. The coupling handle 4 is fastened pivotally with the pivoting seat 31 of the connection portion 3 by means of a pivot 43 which is received in the pivoting holes 32 and 41. The coupling handle 4 is fastened pivotally with the connection portion 3 such that retaining portion 42 of the coupling handling 4 is slightly extended into the through hole 33 of the connection portion 3 via a retaining hole 35 which is located in the wall of the connection portion 3 and is corresponding in location to the center of the pivoting seats 31 of the connection portion 3. As a connecting end 2 of the pipeline is joined with the connection portion 3 of the pipe joint 1 of the present invention, the retaining portion 42 of the coupling handle 4 is received securely in a recess 21 of the connecting end 2 of pipe line.

The auxiliary handles 5 are similar in construction to each other and are mounted pivotally on the pivot 43 on which the coupling handles 4 are mounted. Each of the auxiliary handles 5 is provided at one end thereof with a retaining portion 54 having a pivoting hole 53 in which the pivot 43 is received. The auxiliary handle 5 is further provided at another end thereof with a press flap 51 and a moving flap 52 capable of actuating the auxiliary handle 5. The coupling handle 5 and the auxiliary handle 4 are fastened side by side such that the retaining portion 54 of the auxiliary handle 5 is received securely in the recess 21 of the connecting end 2 at such time when the coupling handle 4 is actuated accidentally. In other words, the pipe joint of the present invention is provided with an extra safeguard against the accidental leak of the pipe joint, thanks to the auxiliary handles 5 of the present invention.

Figure 3:
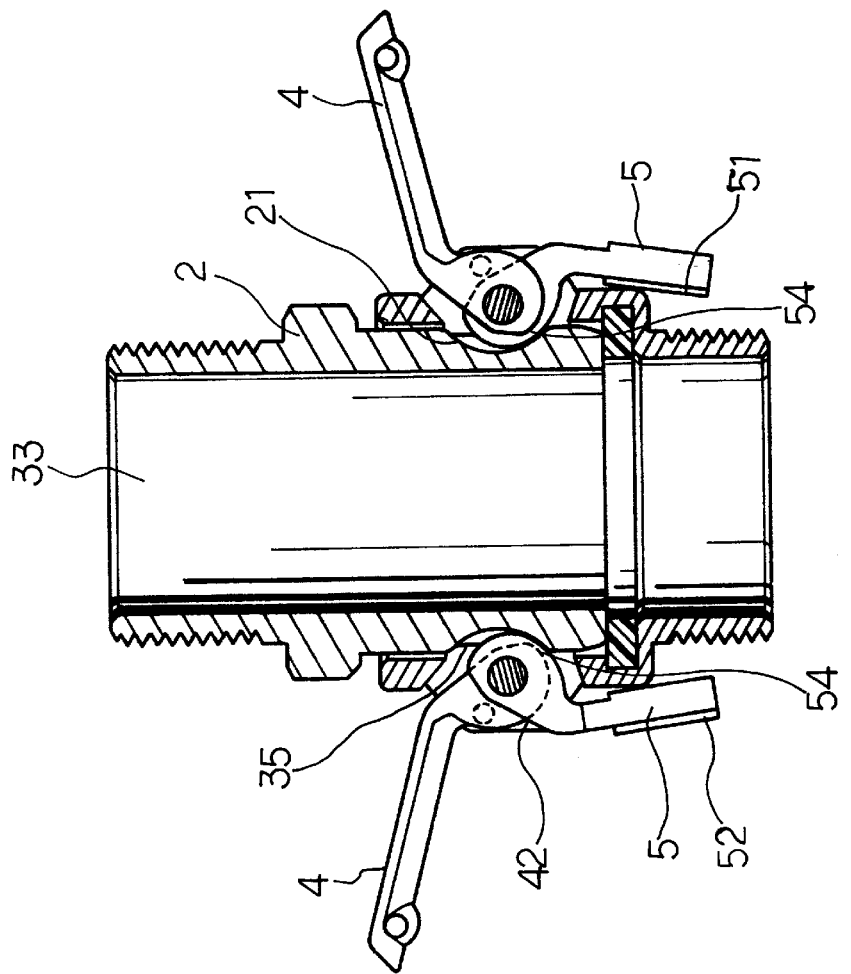
FIG. 3 shows a longitudinal sectional view of the present invention at work.

As illustrated in FIG. 3, the pipe joint of the present invention is joined with the connecting end 2 of the pipe line, which is received in the through hole 33 of the pipe joint of the present invention. The coupling handles 4 are pressed to make contact with the outer wall surface of the pipe joint 1 of the present invention. In the meantime, the press flap 51 of the auxiliary handles 5 is located under the coupling handle 4. As a result, the press flap 51 of the auxiliary handles 5 is bound to be actuated by the coupling handle 4, thereby causing the auxiliary handle 5 to displace along with the coupling handle 4. The auxiliary handle 5 is caused to displace such that the retaining portion 54 of the auxiliary handle 5 is engaged securely with the recess 21 of the connecting end 2 of the pipeline.

Figure 4:
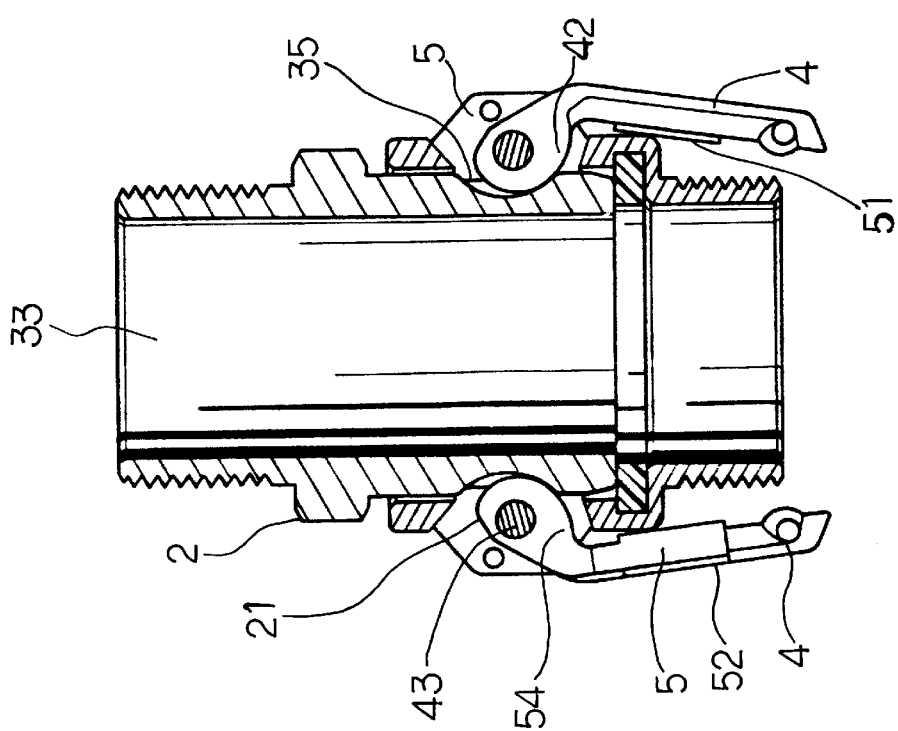
FIG. 4 shows a schematic view illustrating the coordinating actions of the coupling handles and the auxiliary handles of the present invention.
Figure 5:
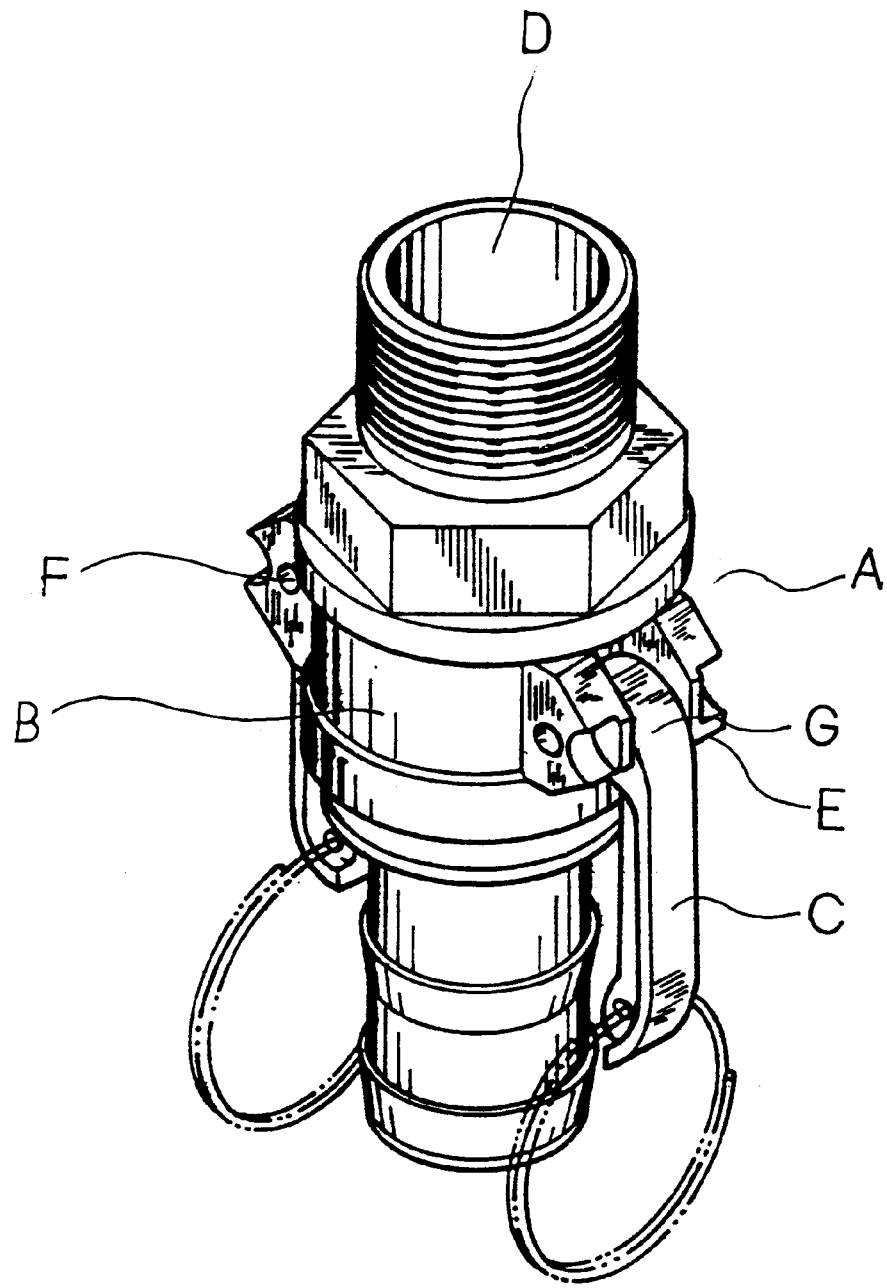
FIG. 5 shows a perspective view of a pipe joint of the prior art.

The pipe joint 1 of the present invention can be discovered with the connecting end 2 of the pipeline by actuating the coupling handles 4 with a person's hand in a direction away from the outer wall surface of the pipe joint 1 of the present invention, as illustrated in FIG. 4. The auxiliary handles 5 can be then caused to move in the same direction by actuating the moving flaps 52 of the auxiliary handles 5 with a person's hand. In other words, the coupling handles 4 and the auxiliary handles 5 are independently set up. For this reason, the connecting end 2 of the pipeline remains securely connected with the pipe joint 1 of the present invention in the event that the coupling handles 4 are accidentally actuated.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claim.

What is claimed is:

1. A pipe joint comprising:

a connecting portion of a hollow cylindrical construction and having a wall which is provided in an outer surface thereof with two pivoting seats fastened therewith such that said two pivoting seats are opposite in location to each other, said two pivoting seats provided with a pivoting hole, said connection portion provided with a through hole extending in the direction of a longitudinal axis of said connection portion, and a retaining hole located in the wall of said connection portion such that said retaining hole is corresponding in location to a center of said two pivoting seats, and that said retaining hole is in communication with said through hole of said connection portion, said connection portion being engaged at one end thereof with a pipeline connecting end which is provided with a recess; and two coupling handles provided respectively at one end thereof with a retaining portion which is provided with a pivoting hole corresponding in location to said pivoting holes of said pivoting seats of said connection portion, each of said two coupling handles being fastened pivotally with said connection portion by a pivot which is received in said pivoting holes of said pivoting seats and said retaining portion, with said retaining portion being retained in said retaining hole of said connection portion such that said retaining portion is extended into said through hole of said connection portion to engage securely the recess of the pipeline connecting end received in said through hole of said connection portion;

wherein said connection portion is further provided with two auxiliary handles fastened pivotally with said pivoting seats of said connection portion, said auxiliary handles consisting of a retaining portion, a press flap and a moving flap, said retaining portion of said auxiliary handles provided with a pivoting hole, said auxiliary handles being fastened pivotally with said connection portion such that said auxiliary handles are fastened pivotally side by side with said coupling handles by said pivot which is received in said pivoting holes of said retaining portions of said auxiliary handles and said coupling handles, and that said retaining portion of said auxiliary handles is retained in said retaining hole of said connection portion, and further that said retaining portion of said auxiliary handles is extended into said through hole of said connection portion to engage securely the recess of the pipeline connecting end, and further that said press flap of said auxiliary handles is located under said coupling handles so as to enable said auxiliary handles to be moved by said coupling handles, said moving flap of said press flap is actuated by said coupling handles, said moving flap of said auxiliary handles intended for actuating said auxiliary handles with a person's hand so as to enable said connection portion to be disconnected with the pipeline.

* * * * *